(12) United States Patent
Gu et al.

(10) Patent No.: US 8,524,048 B2
(45) Date of Patent: Sep. 3, 2013

(54) PROCESSES FOR RECOVERING SILANE FROM HEAVY-ENDS SEPARATION OPERATIONS

(75) Inventors: Zhihui Gu, Houston, TX (US); Timothy D. Truong, Pearland, TX (US); Puneet Gupta, Houston, TX (US)

(73) Assignee: MEMC Electronic Materials, Inc., St. Peters, MO (US)

( * ) Notice: Subject to any disclaimer, the term of this patent is extended or adjusted under 35 U.S.C. 154(b) by 349 days.

(21) Appl. No.: 12/898,494

(22) Filed: Oct. 5, 2010

(65) Prior Publication Data
US 2012/0080304 A1 Apr. 5, 2012

(51) Int. Cl.
*B01D 3/14* (2006.01)
*C01B 33/04* (2006.01)
*F25J 1/00* (2006.01)

(52) U.S. Cl.
USPC ............ 203/81; 203/29; 203/32; 203/71; 423/347; 62/606

(58) Field of Classification Search
USPC ............ 202/154, 155, 156, 158; 203/29, 203/32, 71, 81; 423/347; 62/606
See application file for complete search history.

(56) References Cited

U.S. PATENT DOCUMENTS

| | | | |
|---|---|---|---|
| 3,886,221 A * | 5/1975 | Agee et al. | 570/242 |
| 3,903,183 A * | 9/1975 | Wikman et al. | 570/242 |
| 4,099,936 A * | 7/1978 | Tarancon | 95/127 |
| 4,340,574 A | 7/1982 | Coleman | |
| 4,554,141 A | 11/1985 | Scull et al. | |
| 4,610,858 A * | 9/1986 | Yamada et al. | 423/342 |
| 4,632,816 A | 12/1986 | Marlett | |
| 4,676,967 A * | 6/1987 | Breneman | 423/347 |
| 5,075,092 A | 12/1991 | Boone et al. | |
| 5,206,004 A | 4/1993 | Park | |
| 5,211,931 A | 5/1993 | Allen et al. | |
| 5,681,908 A * | 10/1997 | Mehra et al. | 526/68 |
| 5,735,141 A * | 4/1998 | Whitlock | 62/620 |
| 6,942,844 B2 * | 9/2005 | Muller et al. | 423/347 |
| 7,879,198 B2 * | 2/2011 | Ghetti | 203/29 |
| 2011/0189073 A1 * | 8/2011 | Kang et al. | 423/347 |

FOREIGN PATENT DOCUMENTS
EP 0811815 A2 10/1997

OTHER PUBLICATIONS

Coker, A. Kayode, Ludwig's Applied Process Design for Chemical and Petrochemical Plants, Jun. 10, 2010, Gulf Professional Publishing, vol. 2, 4th Edition, pp. 257-260.*
Douglas, A.P.; Hoadley, A.F.A.; A process integration approach to the design of two- and three-column methanol distillation schemes, Aug. 24, 2005, Applied Thermal Engineering, vol. 26, pp. 338-349.*
Co-owned U.S. Appl. No. 13/246,574 entitled "Systems for Purifying Silane," filed Sep. 27, 2011.
Co-owned U.S. Appl. No. 13/246,571 entitled "Processes for Purifying Silane," filed Sep. 27, 2011.

(Continued)

*Primary Examiner* — N. Bhat
*Assistant Examiner* — Jonathan Miller
(74) *Attorney, Agent, or Firm* — Armstrong Teasdale LLP

(57) ABSTRACT

Processes and systems for purifying silane-containing streams are disclosed with relatively less silane being lost in impurity streams by use of distillation and/or condensation operations.

16 Claims, 9 Drawing Sheets

(56) References Cited

OTHER PUBLICATIONS

Dirk Müller, Georg Ronge, Johannes-Peter Schäfer, Hans-Joachim Leimkühler, Development and Economic Evaluation of a Reactive Distillation Process for Silane Production, Bayer AG, D-51368 Leverkusen, http://www.nt.ntnu.no/users/skoge/prost/proceedings/distillation02/dokument/4-1.pdf, 11 pages.

Co-owned U.S. Appl. No. 12/898,487 entitled "Systems for Recovering Silane From Heavy-Ends Separation Operations," filed Oct. 5, 2010, 33 pages.

Invitation to Pay Additional Fees and, Where Applicable, Protest Fee, dated Jan. 6, 2012 in Corresponding International Application No. PCT/US2011/052588.

Office Action dated Dec. 18, 2012 in Co-Owned U.S. Appl. No. 12/898,487.

Couper, James R.; Penney, W. Roy; Fair, James R.; Walas, Stanley M. Sep. 8, 2009, Chemical Process Equipment-Selection and Design, 3rd Edition, pp. 126-135.

\* cited by examiner

PROCESSES FOR RECOVERING SILANE FROM HEAVY-ENDS SEPARATION OPERATIONS

BACKGROUND

The field of the disclosure relates to purification of silane-containing streams and, particularly, to methods for purifying silane with relatively less silane being lost in impurity streams by use of distillation and/or condensation operations.

Silane is a versatile compound that has many industrial uses. In the semiconductor industry, silane may be utilized for deposition of an epitaxial silicon layer on semiconductor wafers and for production of polycrystalline silicon. Polycrystalline silicon is a vital raw material used to produce many commercial products including, for example, integrated circuits and photovoltaic (i.e., solar) cells that may be produced by thermal decomposition of silane onto silicon particles in a fluidized bed reactor.

Silane may be produced by reacting silicon tetrafluoride with an alkali or alkaline earth metal aluminum hydride such as sodium aluminum tetrahydride as disclosed in U.S. Pat. No. 4,632,816, which is incorporated herein by reference for all relevant and consistent purposes. Silane may alternatively be produced by the so-called "Union Carbide Process" in which metallurgical-grade silicon is reacted with hydrogen and silicon tetrachloride to produce trichlorosilane as described by Müller et al. in "Development and Economic Evaluation of a Reactive Distillation Process for Silane Production," *Distillation and Adsorption: Integrated Processes*, 2002, which is incorporated herein by reference for all relevant and consistent purposes. The trichlorosilane is subsequently taken through a series of disproportionation and distillation steps to produce a silane end-product.

After silane is produced, it is conventionally taken through a purification process to remove impurities prior to use (e.g., prior to epitaxial layer production or polycrystalline silicon production). Examples of impurities that may be present in the silane-containing process streams include, for example, nitrogen, methane, hydrogen, ethane, ethylene, ethyl-silane, diethyl silane, toluene, dimethoxyethane and combinations of these impurities. Examples of such purification processes include those disclosed in U.S. Pat. Nos. 5,206,004; 4,554,141 and 5,211,931, each of which is incorporated herein by reference for all relevant and consistent purposes. Such conventional processes may adequately purify silane-containing process streams; however, they are characterized by relatively high rates of unrecoverable silane.

A continuing need therefore exists for processes for purifying silane-containing process streams that achieve relatively high silane purity and a relatively high rate of silane recovery. A need also exists for systems for such processes.

SUMMARY

One aspect of the present disclosure is directed to a process for purifying a silane-containing stream. The stream contains silane and one or more compounds having a boiling point greater than silane. The process includes introducing the silane-containing stream to a heavy-ends distillation column to produce a silane-enriched overhead fraction and a silane-depleted bottoms fraction relative to the silane-containing stream. The silane-depleted bottoms fraction contains silane and is enriched in one or more compounds having a boiling point greater than silane relative to the silane-containing stream. The silane-depleted bottoms fraction is introduced into a silane-recovery separation unit to produce a silane-enriched fraction and a silane-depleted fraction relative to the silane-depleted bottoms fraction produced from the heavy-ends distillation column.

Various refinements exist of the features noted in relation to the above-mentioned aspects of the present disclosure. Further features may also be incorporated in the above-mentioned aspects of the present disclosure as well. These refinements and additional features may exist individually or in any combination. For instance, various features discussed below in relation to any of the illustrated embodiments of the present disclosure may be incorporated into any of the above-described aspects of the present disclosure, alone or in any combination.

BRIEF DESCRIPTION OF THE DRAWINGS

Corresponding reference characters indicate corresponding parts throughout the drawings.

DETAILED DESCRIPTION

Figure 1:
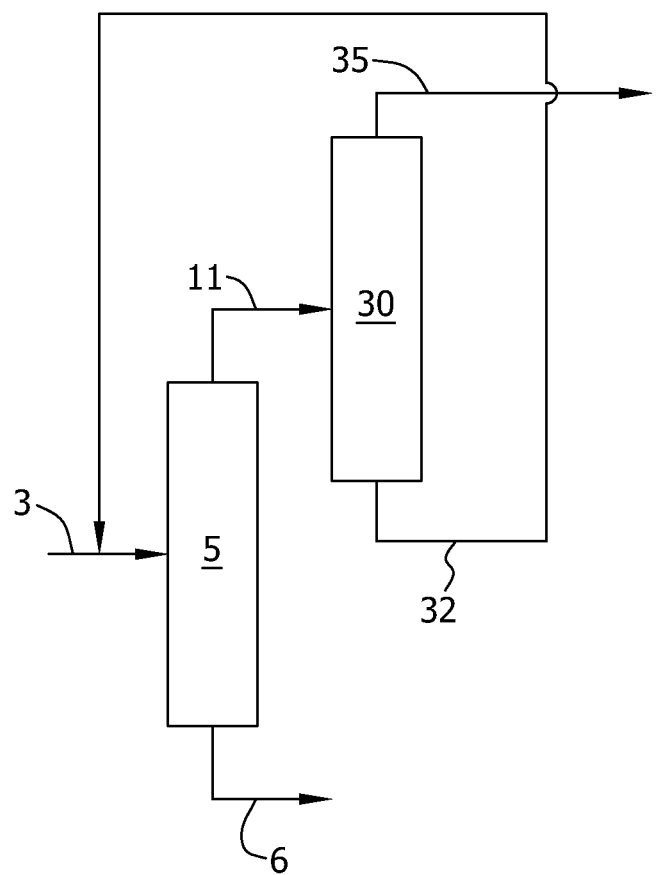
FIG. 1 is a schematic of a system for recovering silane from the overhead fraction of a light-ends distillation column according to a first embodiment of the present disclosure.

In accordance with various embodiments of the present disclosure, processes for purifying silane that involve distillation operations and which achieve high purity and high silane recovery relative to conventional processes are herein disclosed. Further, purification systems for carrying out such processes are provided. Embodiments of such processes and systems may include recovery of silane from process streams separated from the silane-containing stream (e.g., process streams that include a relatively higher amount of compounds with a boiling point less than silane and/or streams that include a relatively higher amount of compounds with a boiling point greater than silane relative to the silane-containing stream which is purified). Silane may be removed from these impurity streams by use of distillation or condensation operations as discussed further below.

Silane-Containing Streams that may be Purified

The silane-containing streams that may be purified according to embodiments of the present disclosure may contain a wide variety of impurities and may contain those impurities in a wide range of amounts without departing from the scope of the present disclosure. The silane-containing stream may have been subjected to one or more purification steps prior to performing the purification process of embodiments of the present disclosure (e.g., removal of an amount of impurities with a boiling point less than silane or a boiling point greater than silane). The amount of silane in the silane-containing stream prior to being subjected to the purification processes of the present disclosure may be at least about 10 wt %, at least about 30 wt %, at least about 50 wt %, at least about 70 wt %, at least about 85 wt %, at least about 95 wt % or even at least about 99 wt % (e.g., from about 50 wt % to about 99 wt % or from about 70 wt % to about 99 wt %). The silane-containing stream may be substantially free (e.g., contain less than about 0.1 mol % or less than about 0.01 mol%) of alkali or alkaline earth-metal silanes and, alternatively or in addition, may be substantially free of trichlorosilane, tetrachlorosilane and tetrafluorosilane. In some embodiments, these compounds are substantially removed from the silane-containing stream prior to performing the processes of the present disclosure.

The silane-containing stream that is subjected to the processes of the present disclosure may contain one or more impurities with a boiling point greater than silane and/or one or more impurities with a boiling point less than silane. In this regard, the boiling point of silane is about −112° C. Impurities that have a boiling point greater than silane include, for example, ethane, ethylene, ethyl-silane, diethyl silane, toluene, and dimethoxyethane. Impurities that have a boiling point less than silane include, for example, hydrogen, nitrogen, and methane.

The starting silane-containing stream may be a gas or may be a liquid without departing from the scope of the present disclosure. In this regard, the silane-containing stream may be within any range of temperatures and pressures including, but not limited to, pressure and temperatures typical of silane production and/or processing.

Processes for Purifying Silane that Include Recovery from Light-ends Streams

Referring now to FIG. 1 in which a process for purifying silane is shown schematically in accordance with embodiments of the present disclosure, a silane-containing stream 3 is introduced into a light-ends distillation column 5 to produce a silane-enriched bottoms fraction 6 and silane-depleted overhead fraction 11 relative to the silane-containing stream 3. The silane-containing stream 3 contains silane and one or more compounds having a boiling point less than silane (e.g., hydrogen, nitrogen and/or methane). The silane-containing stream 3 may be condensed and compressed prior to introduction into the light-ends distillation column 5. As used herein, "light-ends distillation column" refers to a distillation column in which at least about 50 wt % of the compounds with a boiling point less than silane are separated from the light-ends distillation column feed stream (or feed streams when more than one feed stream is used). Generally, these separated compounds are removed from the distillation column 5 in the silane-depleted overhead fraction 11. In some embodiments of the present disclosure, the overhead fraction 11 contains at least about 50 wt % of the compounds with a boiling point less than silane in the silane-containing stream 3 and, in other embodiments, at least about 60 wt %, at least about 75 wt %, at least about 90 wt % or even at least about 95 wt % of the compounds with a boiling point less than silane in the silane-containing stream 3. The silane-depleted overhead fraction 11 may contain at least about 40 wt % silane and, in other embodiments, contains at least about 50 wt %, at least about 60 wt %, at least about 70 wt % or at least about 75 wt % silane.

Generally, the overhead fraction 11 is enriched in compounds with a boiling point less than silane. In embodiments wherein the silane-containing stream 3 contains compounds with a boiling point greater than silane, the bottoms fraction 6 is enriched in these compounds and the overhead fraction 11 is depleted in these compounds.

The light-ends distillation column 5 may be operated at temperatures and pressures suitable for separating compounds having a boiling point less than silane from silane as appreciated by those of skill in the art. For example, the light-ends distillation column 5 may be operated at an overhead fraction 11 temperature of from about −130° C. to about −50° C. or from about −110° C. to about −70° C. and an overhead fraction pressure of from about 1100 kPa to about 2500 kPa (about 160 psia to about 360 psia) or from about 1400 kPa to about 2200 kPa (about 200 psia to about 320 psia). The bottoms fraction 6 temperature may be from about −50° C. to about −120° C.

Upon discharge from the light-ends distillation column 5, the silane-depleted overhead fraction 11 conventionally is neutralized and disposed as a waste stream. In accordance with the present disclosure, it has been found that the overhead fraction 11 may be processed to recover a significant amount of silane. In some embodiments of the present disclosure, the silane-depleted overhead fraction 11 produced from the light-ends distillation column 5 is introduced into a silane-recovery separation unit 30 to produce a silane-enriched fraction 32 and a silane-depleted fraction 35 relative to the silane-depleted overhead fraction 11 produced from the light-ends distillation column 5. The silane-enriched fraction 32 may be recovered for use by recycling the silane-enriched fraction back to the light-ends distillation column 5.

Figure 2:
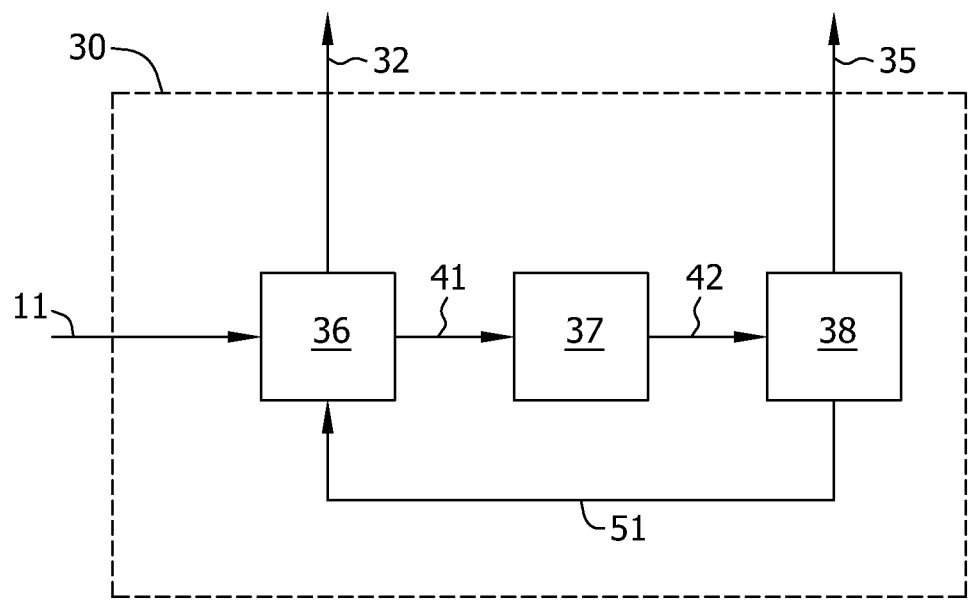
FIG. 2 is a schematic of a silane-recovery separation unit for recovering silane from the overhead fraction of a light-ends distillation column according to a first embodiment of the present disclosure.

The silane-recovery separation unit 30 may be any unit (or even more than one unit) suitable for separating silane from compounds with a boiling point less than silane. For example, the unit 30 may be one or more distillation columns that separate the silane-depleted overhead fraction 11 produced from the light-ends distillation column 5 into a silane-enriched bottoms fraction 32 and a silane-depleted overhead fraction 35 relative to the silane-depleted overhead fraction 11. Alternatively and as shown in FIG. 2, the silane-depleted overhead fraction 11 produced from the light-ends distillation column 5 (FIG. 1) may be cooled to condense a portion of the silane therein, thereby separating silane from the more volatile compounds having a boiling point less than silane. The overhead fraction 11 may be introduced into a condenser 37 to condense silane. The silane-condensed overhead fraction 42 may be introduced into a gas-liquid separator 38 to produce a silane-depleted gaseous stream 35 and a silane-enriched liquid stream 51 relative to the silane-depleted overhead fraction 11 produced from the light-ends distillation column 5. The silane-enriched liquid stream 51 contains condensed silane which may be recycled for use.

Optionally and as shown in FIG. 2, the overhead fraction 11 may be first introduced into a heat exchanger 36 (e.g., an interchanger) to cool and potentially partially condense the silane-depleted overhead fraction 11 produced from the light-ends distillation column 5. The overhead fraction 11 may be thermally contacted with the liquid stream 51 produced from the gas-liquid separator 38 to condense a portion of the silane in the silane-depleted overhead fraction 11 produced from the light-ends distillation column 5.

The heat exchanger 36 may be any suitable apparatus for cooling and or condensing silane-containing streams such as, for example, a shell and tube heat exchanger with the silane-containing gaseous stream 11 being on the shell side and the condensed silane stream 51 being on the tube side. The condenser 37 may also be a shell and tube exchanger with the cooled and/or partially condensed silane-containing gas stream 41 being on the shell side and a cooling fluid (e.g., liquid nitrogen) being on the tube side. The gas-liquid separator 38 may include vessels in which the pressure, temperature and/or velocity of the incoming stream 42 is reduced causing entrained liquid to separate from the gas. The gas-liquid separator 38 may include a demister to further cause entrained liquid to aggregate into droplets for removal from the gas stream.

In this regard, it should be understood that optionally and in several embodiments of the present disclosure, the process is performed without the heat exchanger 36 and the overhead fraction 11 is introduced directly into the condenser 37. Regardless of whether a heat exchanger 36 is used, the overhead fraction 11 may be cooled to less than about −100° C. in the condenser 37, less than about −115° C., less than about −130° C., less than about −145° C. or even less than about −160° C. (e.g., at pressures from about 1100 kPa to about 2500 kPa (about 160 psia to about 360 psia) or from about 1400 kPa to about 2200 kPa (about 200 psia to about 320 psia).

In embodiments wherein the heat exchanger 36 is used, the overhead fraction 11 may be cooled to less than about −50° C. in the heat exchanger or less than about −70° C., less than about −85° C. or even less than about −100° C. (e.g., at pressures from about 1100 kPa to about 2500 kPa (about 160 psia to about 360 psia) or from about 1400 kPa to about 2000 kPa (about 200 psia to about 290 psia).

Regardless of whether a heat exchanger 36 is used with the condenser 37, the amount of silane in the silane-depleted overhead fraction 11 produced from the light-ends distillation column 5 that is condensed by the condenser 37 and, optionally, the heat exchanger 36 may be at least about 60% and, in other embodiments, at least about 75%, at least about 85%, at least about 90% or at least about 95% of the silane in the silane-depleted overhead fraction 11 is condensed.

The liquid stream 51 produced from the gas-liquid separator 38 may be introduced into the heat exchanger 36 to condense a portion of the silane in the silane-depleted overhead fraction 11. A portion of the silane-enriched liquid stream 51 may be partially vaporized in the heat exchanger 36 and the stream may be heated to a temperature ranging from −125° C. to about 10° C. In some embodiments, the silane-enriched liquid stream 51 is fully vaporized in the heat exchanger 36.

The silane stream 32 exiting the heat exchanger 36 may optionally be heated to about ambient temperature to combine with crude silane 3 (FIG. 1) which may be pressurized for introduction into the light-ends distillation column 5. Suitable heaters (not shown) include, for example, finned exchangers that use ambient air to heat the silane stream 32. The vaporized silane stream 32 may be recondensed and recycled to the light-ends distillation column 5. The silane stream 32 may be relatively pure and, in some embodiments, contains at least about 90 wt % silane and, in other embodiments, at least about 92 wt %, at least about 95 wt %, or at least about 97 wt % silane (e.g., from about 90 wt % to 99.9 wt % or from about 95 wt % to about 99.9 wt %). Alternatively or in addition, at least about 80 wt % of the silane in the overhead fraction 11 produced from the light-ends distillation column 5 is recovered in the silane stream 32 and, in other embodiments, at least about 75 wt %, at least about 85 wt %, at least about 90 wt %, at least about 93 wt %, at least about 96 wt % or even at least about 98 wt % of silane in the overhead fraction 11 is recovered in the silane stream 32 (e.g., from about 75 wt % to about 99.9 wt %, from about 85 wt % to about 99.9 wt % or from about 93 wt % to about 99.9 wt %).

The silane-depleted overhead fraction 35 produced from the silane-recovery separation unit 30 may be treated (e.g., neutralized) and disposed of (e.g., by exhausting it to the ambient). The overhead fraction 35 may be heated by use of, for example, a natural convection finned heat exchanger (not shown) before disposal. In accordance with embodiments of the present disclosure, use of the silane-recovery separation unit 30 allows the amount of waste gas that is naturalized and disposed of to be reduced relative to conventional processes in which a silane-recovery separation unit 30 is not used. For example, at least about 60 wt % of the overhead fraction 11 may be recovered in the silane stream 32 or, as in other embodiments, at least about 65 wt %, at least about 70 wt % or even at least about 75 wt % of the overhead fraction 11 is recovered in the silane stream 32 (e.g., from about 65 wt % to about 90 wt % or from about 65 wt % to about 80 wt %).

The overhead fraction 35 preferably contains a minimal amount of silane and, in some embodiments, contains less than about 10 wt % of the silane in the silane-depleted overhead fraction 11 produced from the light-ends distillation column 5. In other embodiments, the overhead fraction 35 contains less than about 8 wt %, less than about 6 wt %, or less than about 4 wt % of the silane in the silane-depleted overhead fraction 11 produced from the light-ends distillation column 5.

Figure 3:
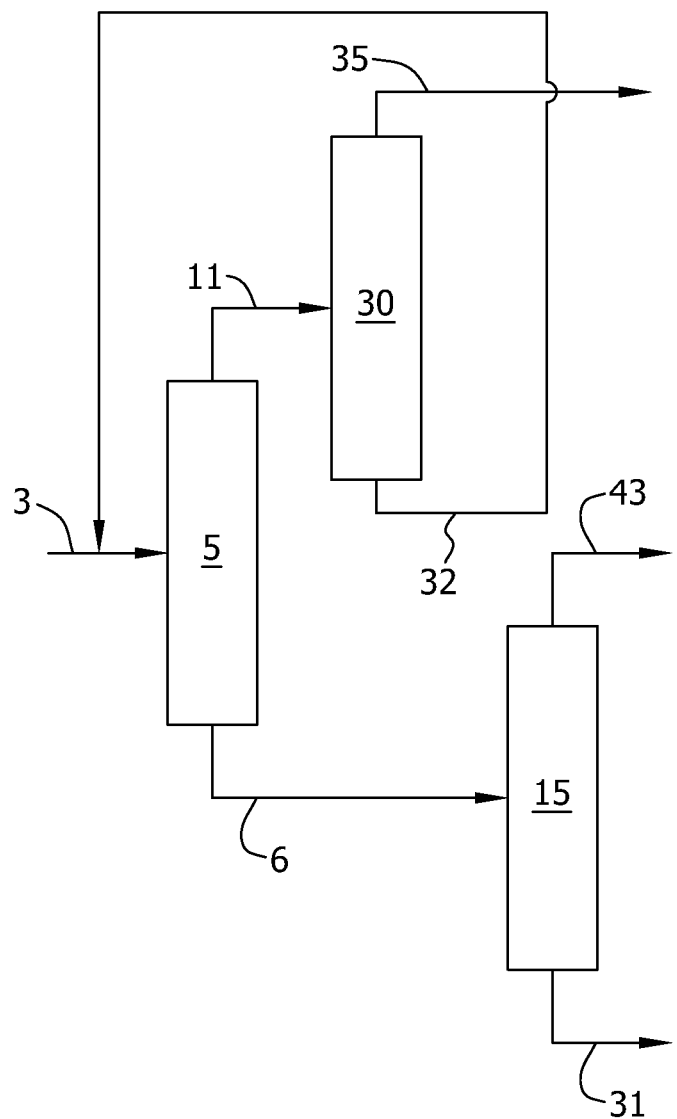
FIG. 3 is a schematic of a system for recovering silane from the overhead fraction of a light-end distillation column according to a second embodiment of the present disclosure.

In accordance with several embodiments of the present disclosure, crude silane may also contain compounds having a boiling point greater than silane. When the silane-containing stream 3 (FIG. 1) contains such compounds with a boiling point greater than silane, the silane-enriched bottoms fraction 6 produced from the light-ends distillation column 5 typically is enriched in compounds with a boiling point greater than silane relative to the silane-containing stream 3. To separate silane from these relatively high boiling point compounds and as shown in FIG. 3, the silane-enriched bottoms fraction 6 may be introduced into a heavy-ends distillation column 15 (which may be operated in accordance with the parameters described below in the section entitled "Processes for Purifying Silane that include Recovery from Heavy-ends Streams") to produce a silane-enriched overhead fraction 43 and a silane-depleted bottoms fraction 31 relative to the silane-enriched bottoms fraction 6 produced from the light-ends distillation column 5. The silane-depleted bottoms fraction 31 is enriched in compounds having a boiling point greater than silane and may be treated (e.g., neutralized) and disposed of Alternatively, the silane-depleted bottoms fraction 31 may be treated to recover silane as described below.

The light-ends distillation column 5, silane recovery separation unit 30 and heavy-ends distillation column 15 may purify silane with small amounts of silane being lost relative to conventional processes. For example and in accordance with some embodiments of the present disclosure, the sum of the amount of silane in the waste streams of the process of FIG. 3 (i.e., the silane-depleted gaseous stream 35 separated in the silane-recovery separation unit 30 and the silane-depleted bottoms fraction 31 produced from the heavy-ends distillation column 15) is less than about 15 wt % of the silane in the silane-containing stream 3 and, in other embodiments, less than about 11 wt %, less than about 8 wt % or less than about 4 wt % of the silane in the silane-containing stream 3.

Generally, in contrast to processes in which trichlorosilane is taken through a series of disproportionation and distillation steps to produce a silane end-product, in embodiments of the present disclosure for purifying silane, the components of the silane-containing stream 3 do not substantially undergo any reaction until being discharged as the overhead fraction 11 produced from the light-ends distillation column 5, as the silane-enriched overhead fraction 43 produced from the heavy-ends distillation column 15, or the silane-depleted bottoms fraction 31 produced from the heavy-ends distillation column 15.

In some embodiments, the silane-containing stream 3 contains an amount of ethylene which exits the heavy-ends distillation column 15 in the silane-enriched overhead fraction 43. The ethylene and silane may be separated by use of an adsorber (e.g., molecular sieve) and/or an ethylsilane distillation column as further described below.

Figure 4:
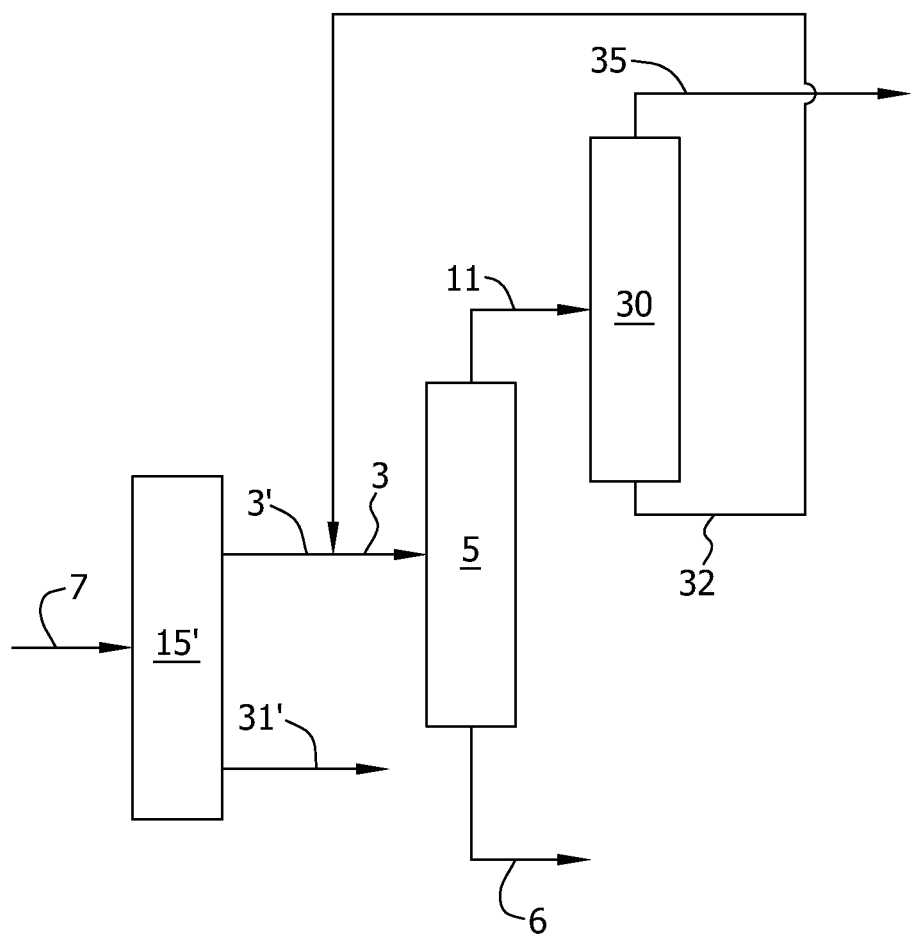
FIG. 4 is a schematic of a system for recovering silane from the overhead fraction of a light-ends distillation column according to a third embodiment of the present disclosure.

In certain other embodiments of the present disclosure, the silane-containing stream 3 may be formed by having compounds with a boiling point greater than silane removed prior to introduction into the light-ends distillation column 5. As shown in FIG. 4, a feed stream 7 containing silane, one or more compounds having a boiling point greater than silane and one or more compounds having a boiling point less than silane is introduced into a heavy-ends distillation column 15' to produce an overhead fraction 3' and a bottoms fraction 31'. The overhead fraction 3' is enriched in silane and enriched in compounds having a boiling point less than silane relative to the feed stream 7. A portion of the overhead fraction 3' forms the silane-containing stream 3 that is fed to the light-ends distillation column 5. The bottoms fraction 31' is depleted in silane and enriched in compounds having a boiling point greater than silane and may be neutralized and disposed of or may be treated to recover silane as described below.

In this regard, the process of FIG. 3 in which light-ends distillation 5 is performed before heavy-ends distillation 15 may be preferred to the process of FIG. 4 in which heavy-ends distillation 15' is performed prior to light-ends distillation 5 as the lower pressures of the down-stream distillation (i.e., the heavy-ends distillation of FIG. 3 and the light-ends distillation of FIG. 4) are better suited for recovery in heavy-ends distillation operations as compared to light-ends distillation operations.

Processes for Purifying Silane that Include Recovery from Heavy-ends Streams

Figure 5:
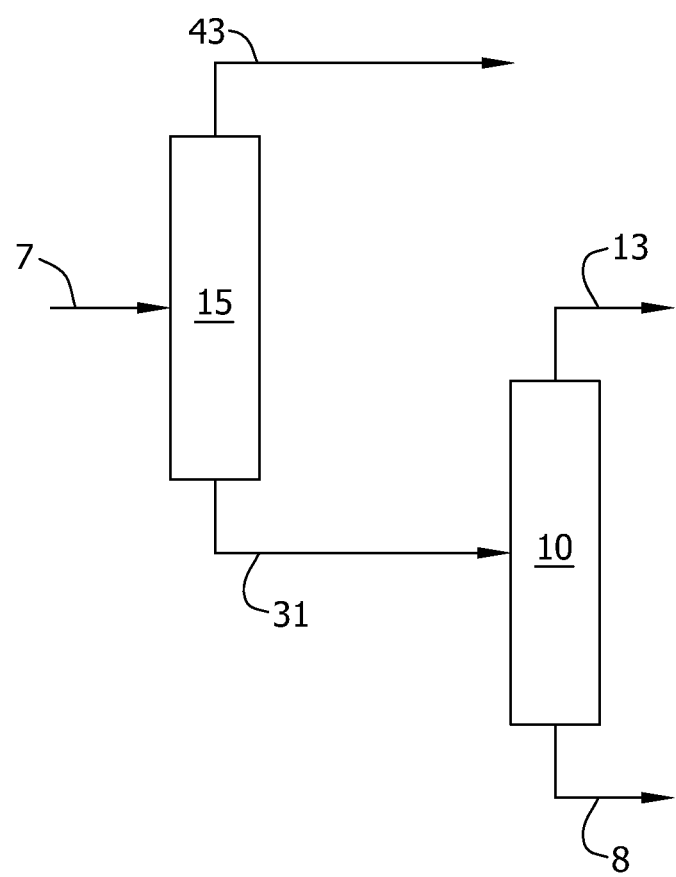
FIG. 5 is a schematic of a system for recovering silane from the bottoms fraction of a heavy-ends distillation column according to a first embodiment of the present disclosure.

Referring now to FIG. 5 in which another process for purifying silane is shown schematically in accordance with embodiments of the present disclosure, a silane-containing stream 7 is introduced into a heavy-ends distillation column 15 to produce a silane-enriched overhead fraction 43 and a silane-depleted bottoms fraction 31 relative to the silane-containing stream 7. The silane-containing stream 7 contains silane and one or more compounds having a boiling point greater than silane (e.g., ethane, ethylene, ethyl-silane, diethyl silane, toluene, and/or dimethoxyethane). The silane-containing stream 7 may be condensed and compressed prior to introduction into the heavy-ends distillation column 15. As used herein, "heavy-ends distillation column" refers to a distillation column in which at least about 50 wt % to the compounds with a boiling point greater than silane are separated from the heavy-ends distillation column feed stream (or feed streams when more than one feed streams are used). Generally, these separated compounds are removed from the heavy-ends distillation column 15 in silane-depleted bottoms fraction 31. The silane-depleted bottoms fraction 31 includes an amount of silane and is enriched in one or more compounds having a boiling point greater than silane relative to the silane-containing stream 7. In some embodiments of the present disclosure, the bottoms fraction 31 contains at least about 50 wt % of the compounds with a boiling point greater than silane in the silane-containing stream 7 and, in other embodiments, at least about 60 wt %, at least about 75 wt %, at least about 90 wt % or at least about 95 wt % of the compounds with a boiling point greater than silane in the silane-containing stream 7. The silane-depleted bottoms fraction 31 may include at least about 20 wt % silane and, in other embodiments, contains at least about 40 wt %, at least about 60 wt %, at least about 80 wt %, at least about 90 wt % or at least about 93 wt % silane.

Generally, the bottoms fraction 31 is enriched in compounds with a boiling point greater than silane. In embodiments wherein the silane-containing stream 7 contains compounds with a boiling point less than silane, the overhead fraction 43 is enriched in these compounds and the bottoms fraction 31 is depleted in these compounds.

The heavy-ends distillation column 15 may be operated at temperatures and pressures suitable for separating compounds having a boiling point greater than silane from silane as appreciated by those of skill in the art. In this regard, relatively higher bottoms fraction 31 temperatures generally reduce the amount of silane in the bottoms fraction 31 but increase the amount of impurities in the silane-enriched overhead fraction 43. Accordingly, the column 15 may be operated below temperatures at which the amount of impurities in the overhead fraction 43 is unacceptable to purification operations. For example, the heavy-ends distillation column 15 may be operated at a bottoms fraction 31 temperature of less than about 10° C. and, in other embodiments, less than about 0° C., less than about −10° C., less than about −20° C., less than about −30° C. or even less than about −40° C. (e.g., from about −50° C. to about 10° C., from about −50° C. to about 0° C. or from about −40° C. to about 0° C.). The distillation column 15 may be operated at pressures from about 1250 kPa to about 3000 kPa (about 180 psia to about 440 psia) or from about 1500 kPa to about 2500 kPa (about 220 psia to about 360 psia).

Upon discharge from the heavy-ends distillation column 15, the silane-depleted bottoms fraction 31 is conventionally neutralized and disposed of as a waste stream. In accordance with the present disclosure, it has been found that the bottoms fraction 31 may be processed to recover a significant amount of silane. In some embodiments of the present disclosure, the silane-depleted bottoms fraction 31 produced from the heavy-ends distillation column 15 is introduced into a silane-recovery separation unit 10 to produce a silane-enriched fraction 13 and a silane-depleted fraction 8 relative to the silane-depleted bottoms fraction 31 produced from the heavy-ends distillation column 15. The silane-enriched fraction 13 may be recovered for use by recycling the silane-enriched fraction 13 back to the heavy-ends distillation column 15 or, as in embodiments wherein a light-ends distillation column (not shown) is used in addition to a heavy-ends distillation column 15 as described below, by recycle to the light-ends distillation column. The silane-enriched fraction 13 may be further processed and/or purified as further described below (e.g., removal of ethylene and its derivatives).

The silane-recovery separation unit 10 may be any unit (or even more than one unit) suitable for separating silane from compounds with a boiling point greater than silane. For example, the unit 10 may be one or more distillation columns that separate the silane-depleted bottoms fraction 31 produced from the heavy-ends distillation column 15 into a silane-enriched overhead fraction 13 and a silane-depleted bottoms fraction 8 relative to the silane-depleted bottoms fraction 31 produced from the heavy-ends distillation column 15. In some embodiments wherein the silane-recovery separation unit 10 is a distillation column, the column may be operated such that the temperature of the silane-depleted bottoms fraction 8 is from about 10° C. to about 80° C. or from about 20° C. to about 50° C. upon discharge from the silane-recovery distillation column 10. In some embodiments wherein the silane-recovery separation unit 10 is a distillation column, the column may be operated such that the temperature of the silane-depleted bottoms fraction 8 is from about 70° C. to about 130° C. or from about 85° C. to about 105° C. upon discharge from the silane-recovery distillation column 10. The distillation column 10 may be operated at an overhead pressure of from about 1500 kPa to about 2600 kPa (about 220 psia to about 380 psia) or from about 1700 kPa to about 2200 kPa (about 250 psia to about 320 psia).

The silane-enriched overhead fraction 13 produced from the silane-recovery separation unit 10 that is recovered for use may contain a small amount of impurities; however, the overhead fraction 13 may contain at least about 90 wt % silane and, in other embodiments, at least about 92 wt %, at least about 95 wt %, or at least about 97 wt % silane (e.g., from about 90 wt % to about 99.9 wt % or from about 95 wt % to about 99.9 wt %). Alternatively or in addition, at least about 80 wt % of the silane in the bottoms fraction 31 produced from the heavy-ends distillation column 15 is recovered in the overhead fraction 13 produced from the silane-recovery separation unit 10 and, in other embodiments, at least about 75 wt %, at least about 85 wt %, at least about 90 wt %, at least about 93 wt %, at least about 96 wt % or even at least about 98 wt % of silane in the bottoms fraction 31 is recovered in the overhead fraction 13 (e.g., from about 75 wt % to about 99.9 wt %, from about 85 wt % to about 99.9 wt % or from about 93 wt % to about 99.9 wt %).

The silane-depleted bottoms fraction 8 produced from the silane-recovery separation unit 10 may be treated (e.g., neutralized) and disposed of by exhausting it to the ambient. In accordance with embodiments of the present disclosure, use of the silane-recovery separation unit 10 allows the amount of waste gas that is neutralized and disposed of to be reduced relative to conventional processes in which a silane-recovery separation unit 10 is not used. For example, at least about 30 wt % of the bottoms fraction 31 may be recovered in the overhead fraction 13 produced from the silane-recovery separation unit 10 or, as in other embodiments, at least about 40%, at least about 50%, at least about 60% or even at least about 70% of the bottoms fraction 31 produced from the heavy-ends distillation column 15 may be recovered in the overhead fraction 13 (e.g., from about 30% to about 90%, from about 30% to about 80% or from about 40% to about 80%).

The bottoms fraction 8 preferably contains a minimal amount of silane and, in some embodiments, contains less than about 10 wt % of the silane in the silane-depleted bottoms fraction 31 produced from the heavy-ends distillation column 15. In other embodiments, the bottoms fraction 8 contains less than about 7.5 wt %, less than about 5 wt %, less than about 2.5 wt % or less than about 1% of the silane in the silane-depleted bottoms fraction 31 produced from the heavy-ends distillation column 15.

Figure 6:
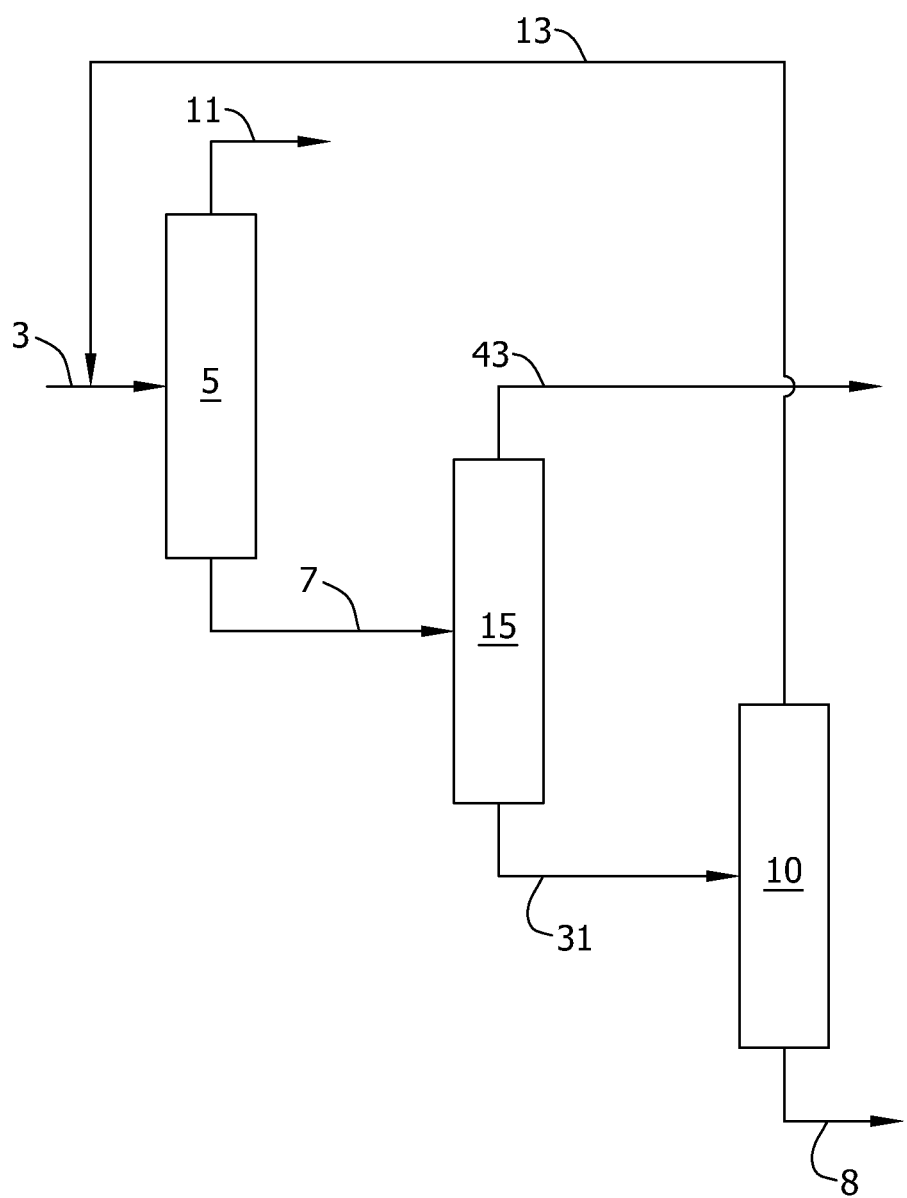
FIG. 6 is a schematic of a system for recovering silane from the bottoms fraction of a heavy-ends distillation column according to a second embodiment of the present disclosure.

In accordance with several embodiments of the present disclosure, crude silane may also contain compounds having a boiling point less than silane. When the crude silane contains such compounds with a boiling point less than silane, a light-ends distillation column 5 (which may be operated in accordance with the parameters described above in the section entitled "Processes for Purifying Silane that include Recovery from Light-ends Streams") may be used to separate these compounds. In one or more exemplary embodiments and as shown in FIG. 6, a feed stream 3 is introduced into a light-ends distillation column 5 to produce an overhead fraction 11 and a bottoms fraction 7 that forms a portion of the silane-containing stream introduced into the heavy-ends distillation column 15. The feed stream 3 contains silane, one or more compounds having a boiling point greater than silane and one or compounds having a boiling point less than silane. The bottoms fraction 7 that is introduced into the heavy-ends distillation column 15 is enriched in silane and depleted in compounds having a boiling point less than silane. The overhead fraction 11 is depleted in silane and enriched in compounds having a boiling point less than silane. The overhead fraction 11 may be treated (e.g., neutralized) and disposed of. Alternatively, the silane-depleted overhead fraction 11 produced from the light-ends distillation column 5 may be treated to recover silane as described above. The overhead fraction 13 produced from the silane recovery separation unit 10 may be recovered by recycling the fraction to the light-ends distillation column 5.

The heavy-ends distillation column 15, silane recovery separation unit 10 and light-ends distillation column 5 may purify silane with small amounts of silane being lost relative to conventional processes. For example and in accordance with some embodiments of the present disclosure, the sum of the amount of silane in the waste streams of the process of FIG. 6 (i.e., the overhead fraction 11 produced from the light-ends distillation column 5 and the silane-depleted bottoms fraction 8 produced from the silane-recovery separation unit 10) is less than about 15 wt % and, in other embodiments, less than about 10 wt %, less than about 5 wt % or less than about 3 wt % of the silane in the silane-containing stream 3.

Generally, in contrast to processes in which trichlorosilane is taken through a series of disproportionation and distillation steps to produce a silane end-product, in embodiments for purifying silane, the components of the feed stream 3 do not substantially undergo any reaction until being discharged as the overhead fraction 11 produced from the light-ends distillation column 5, as the silane-enriched overhead fraction 43 produced from the heavy-ends distillation column 15, the silane-enriched overhead fraction 13 produced from the silane-recovery separation unit 10 or the silane-depleted bottoms fraction 8 produced from the silane-recovery separation unit 10.

Figure 7:
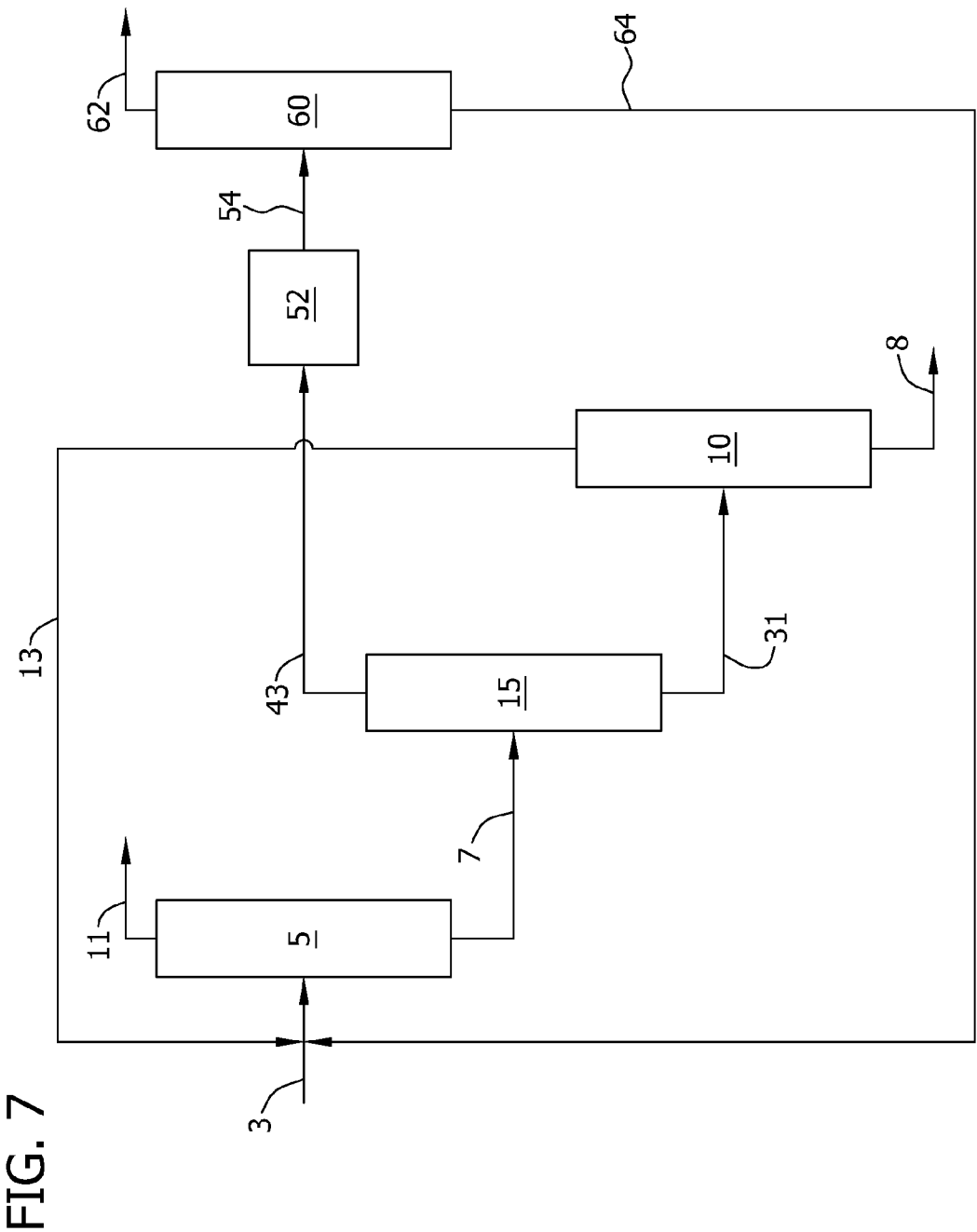
FIG. 7 is a schematic of a system for recovering silane from the bottoms fraction of a heavy-ends distillation column according to a third embodiment of the present disclosure.

In some embodiments, the feed stream 3 contains an amount of ethylene, most of which is separated into the bottoms fraction 7 produced from the light-ends distillation column 5 and into the silane-enriched overhead fraction 43 produced from the light-ends distillation column 15. Referring now to FIG. 7, ethylene may be separated from silane by introducing the overhead fraction 43 into an adsorber 52 to remove a portion of the ethylene (e.g., convert to another compound more readily separable from silane) and form an ethylene-depleted effluent stream 54 as disclosed in U.S. Pat. Nos. 4,554,141; 5,206,004 and 5,211,931, each of which is incorporated herein by reference for all relevant and consistent purposes. The adsorber 52 may be a molecular sieve which causes a portion of the ethylene to react with silane and form ethylsilane. The adsorber 52 may operate at a temperature from about 10° C. to about −100° C. or from about 0° C. to about 60° C. and at a pressure of from about 1500 kPa to about 2600 kPa (about 220 psia to about 380 psia) or from about 1700 kPa to about 2200 kPa (about 250 psia to about 320 psia).

The ethylene-depleted effluent stream 54 containing ethylsilane may be introduced into an ethylsilane distillation column 60 to produce an ethylsilane-depleted overhead fraction 62 comprising purified silane product and an ethylsilane-enriched bottoms fraction 64 relative to the ethylene-depleted effluent stream produced from the adsorber. The ethylsilane-enriched bottoms fraction 64 may be recycled by introducing the ethylsilane-enriched bottoms fraction 64 into the light-ends distillation column 5. The ethylsilane-depleted overhead fraction 62 may contain less than about 10 ppm by weight ethylene and ethane or even less than about 1 ppm, less than about 0.1 ppm or even less than about 0.01 ppm ethylene and ethane. The ethylsilane distillation column 60 may operate at a temperature from about 10° C. to about −100° C. or from about 0° C. to about 60° C. and at a pressure of from about 1500 kPa to about 2600 kPa (about 220 psia to about 380 psia) or from about 1700 kPa to about 2200 kPa (about 250 psia to about 320 psia).

Figure 8:
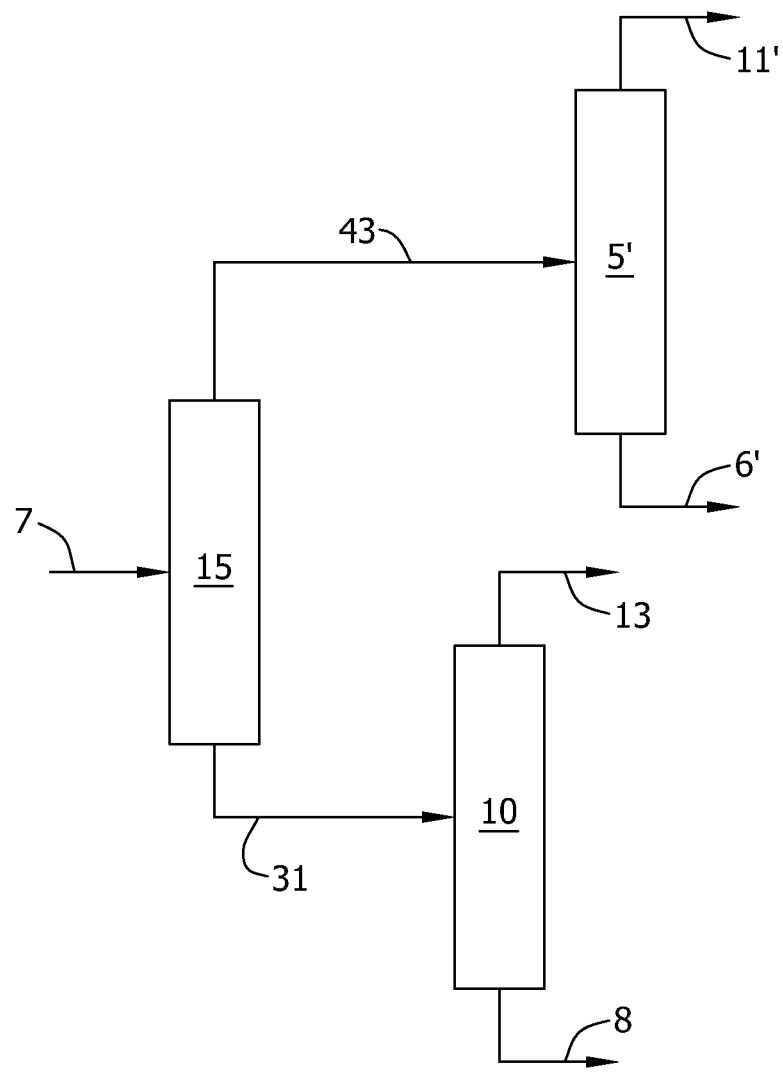
FIG. 8 is a schematic of a system for recovering silane from the bottoms fraction of a heavy-ends distillation column according to a fourth embodiment of the present disclosure.

In certain other embodiments of the present disclosure, the light-ends distillation column 5 may remove compounds with a boiling point less than silane after the silane-containing stream 7 is introduced into the heavy-ends distillation column 15. As shown in FIG. 8, the silane-enriched overhead fraction 43 produced from the heavy-ends distillation column 15 is introduced into a light-ends distillation column 5' to form a silane-depleted overhead fraction 11' containing compounds having a boiling point less than silane and a silane-enriched bottoms fraction 6' relative to the silane-enriched overhead fraction 43 produced from the heavy-ends distillation column 15. In embodiments wherein the silane-containing stream 7 contains ethylene, the majority of the ethylene may be separated into the silane-enriched bottoms fraction 6' produced from the light-ends distillation column 5'. The silane-enriched bottoms fraction 6' may be introduced into an adsorber (not shown) and ethylsilane distillation column (not shown) as in the process and system shown in FIG. 7 and described above. In this regard and as discussed above, the processes of FIG. 6 and FIG. 7 in which light-ends distillation 5 is performed before heavy-ends distillation 15 may be preferred to the process of FIG. 8 in which heavy-ends distillation 15 is performed prior to light-ends distillation 5'.

Processes for Purifying Silane that Include Recovery from Both Light-ends and Heavy-ends Streams The processes described above (e.g., recovery from the light-ends stream and recovery from the heavy-end stream) may be operated in combination to recover further silane from the waste streams. As show shown in FIG. 9, a silane-containing stream 3 containing one or more compounds having a boiling point less than silane and one or more compounds with a boiling point greater than silane is introduced into a light-ends distillation column 5 to produce a silane-depleted overhead fraction 11 and a silane-enriched bottoms fraction 6 relative to the silane-containing stream 3. The silane-depleted overhead fraction 11 includes silane and is enriched in compounds having a boiling point less than silane. The silane-depleted overhead fraction 11 produced from the light-ends distillation column 5 is cooled in a condenser 37 to condense a portion of the silane therein. The silane-condensed overhead fraction 42 is introduced into a gas-liquid separator 38 to produce a gaseous stream 35 and a liquid stream 51 containing condensed silane. The liquid stream 51 is thermally contacted with the silane-depleted overhead fraction 11 in a heat exchanger 36 (e.g., an interchanger) to condense a portion of the silane in the silane-depleted overhead fraction 11 produced from the light-ends distillation column 5. The vaporized stream 32 may be heated to about ambient temperature (e.g., in a heating apparatus (not shown)) and introduced into the light-ends distillation column 5.

The silane-enriched bottoms fraction 6 produced from the light-ends distillation column 5 is introduced into a heavy-ends distillation column 15 to produce a silane-enriched overhead fraction 43 and a silane-depleted bottoms fraction 31 relative to the silane-enriched bottoms fraction 6 produced from the light-ends distillation column 5. The silane-depleted bottoms fraction 31 contains silane and is enriched in one or more compounds having a boiling point greater than silane relative to the silane-enriched bottoms fraction 6 produced from the light-ends distillation column 5. The silane-depleted bottoms fraction 31 produced from the heavy-ends distillation column 15 is introduced into a silane-recovery separation unit 10 (e.g., distillation column) to produce a silane-enriched overhead fraction 13 and a silane-depleted bottoms fraction 8 relative to the silane-depleted bottoms fraction 31 produced from the heavy-ends distillation column 15.

In embodiments wherein the silane-containing stream 3 contains ethylene, the majority of the ethylene may be separated into the silane-enriched overhead fraction 43 produced from the heavy-ends distillation column 15. The overhead fraction 43 may be introduced into an adsorber (not shown) and ethylsilane distillation column (not shown) as in the process and system shown in FIG. 7 and described above to separate ethylene from silane.

Figure 9:
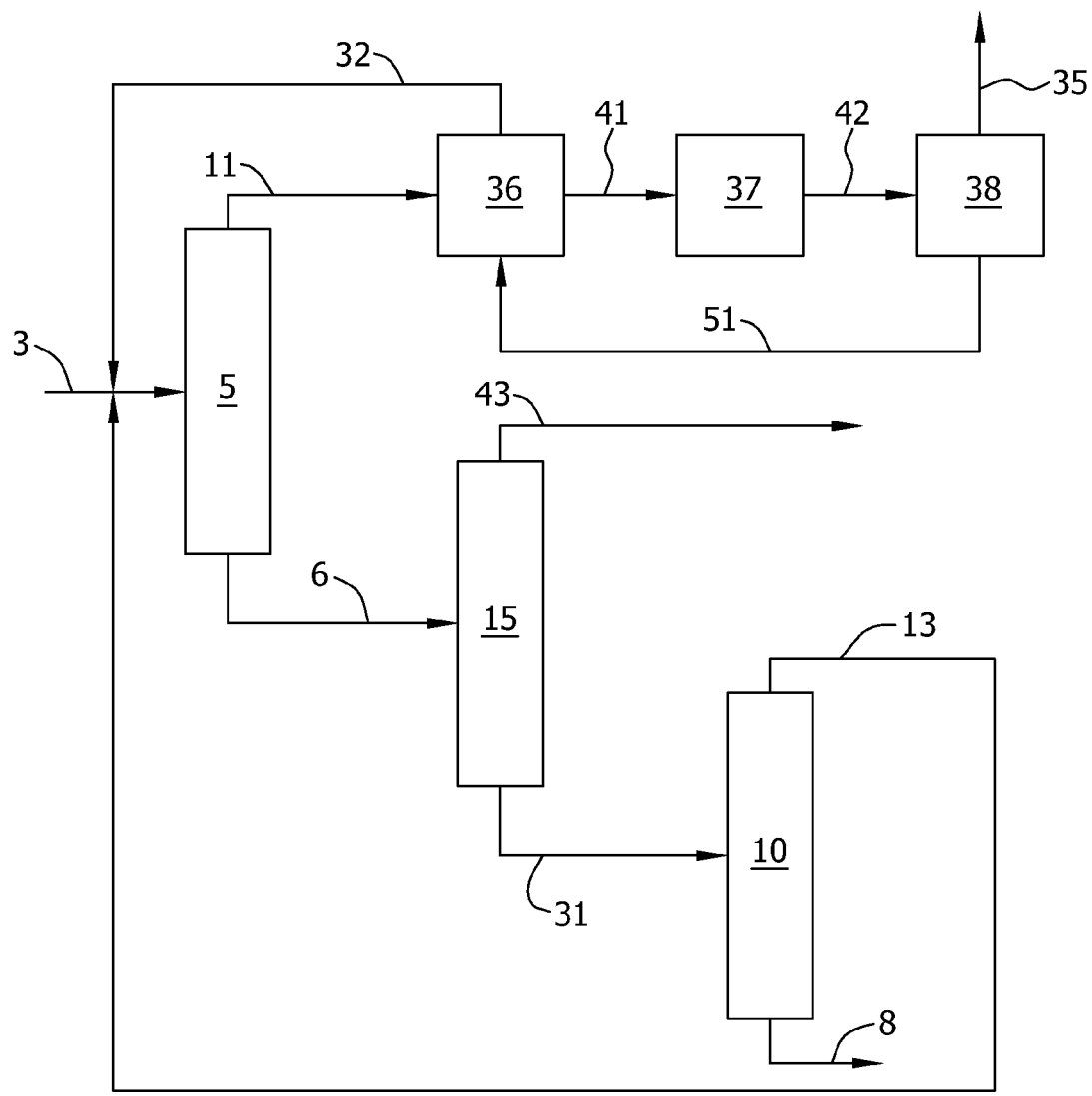
FIG. 9 is a schematic of a system for recovering silane from the overhead fraction of a light-ends distillation column and from the bottoms fraction of a heavy-ends distillation column according to a first embodiment of the present disclosure.

In this regard, it should be understood that the equipment shown in FIG. 9 (e.g., light-end distillation, heavy-end distillation, condenser, silane-recovery unit and the like) may be operated as described previously.

Generally, the components of the silane-containing stream 3 do not substantially undergo any reaction until being discharged as the overhead fraction 11 produced from the light-ends distillation column 5, as the silane-enriched overhead fraction 43 produced from the heavy-ends distillation column 15, or the silane-depleted bottoms fraction 8 produced from the silane-recovery separation unit 10.

The process shown in FIG. 9 allows silane in the waste streams to be recovered. The amount of silane in the gaseous stream 35 separated from the condensed silane 51 may be less than about 10 wt % of the silane in the silane-depleted overhead fraction produced from the light-ends distillation column 5 or, as in other embodiments, less than about 8 wt %, less than about 6 wt %, or less than about 4 wt % of the silane in the silane-depleted overhead fraction 11 produced from the light-ends distillation column 5.

In these and in other embodiments, the amount of silane in the silane-depleted bottoms fraction 8 produced from the silane-recovery separation unit 10 may be less than about 10 wt % of the silane in the silane-depleted bottoms fraction 31 produced from the heavy-ends distillation column 15, or, as in other embodiments, the amount of silane in the silane-depleted bottoms fraction 8 produced from the silane-recovery separation unit 10 may be less than about 7.5 wt %, less than about 5 wt %, less than about 2.5 wt % or less than about 1% of the silane in the silane-depleted bottoms fraction 31 produced from the heavy-ends distillation column 15.

In regard to the total amount of silane lost in the process and system of FIG. 9, the sum of the amount of silane in the gas stream 35 and the silane-depleted bottoms fraction 8 produced from the silane-recovery separation unit 10 may be less than about 10 wt % of the silane in the silane-containing stream 3 or less than about 5 wt %, less than about 3 wt %, less than about 1 wt %, less than about 0.5 wt % or even less than about 0.3 wt % of the silane in the silane-containing stream 3.

In this regard, it should be understood that the above-referenced processes may be operated in a parallel manner (e.g., more than one train of equipment that purify silane in a parallel fashion may be used) and flows from the various trains may be combined and/or process flows may be separated at any point within the process. Further in this regard, it should be understood that the equipment described above (e.g., distillation column or separator) may include one or more units that are operated in parallel or series (e.g., a distillation operation may include use of two distillation columns operated in series or parallel) and reference to a single piece of equipment should not be considered in a limiting sense. It should also be understood that the systems and processes shown in FIGS. 1-9 are exemplary and the illustrated systems and processes may be used in any combination without limitation.

Systems for Purifying Silane from Light-ends Streams, Heavy-ends Streams or Both Light-ends Streams and Heavy-ends Streams The processes of the present disclosure may be carried out in a system for purifying silane such as, for example, the systems shown in FIGS. 1-9 and described above. In some embodiments and as shown in FIG. 1, the system purifies a silane-containing stream 3 comprising silane and one or more compounds having a boiling point less than silane. The system includes a light-ends distillation column 5 for producing a silane-depleted overhead fraction 11 and a silane-enriched bottoms fraction 6 relative to the silane-containing stream 3, the silane-depleted overhead fraction 11 comprising silane and compounds having a boiling point less than silane. The system also includes a condenser 37 (FIG. 2) for condensing a portion of the silane in the silane-depleted overhead fraction 11 produced from the light-ends distillation column 5 and a gas-liquid separator 38 for producing a gaseous stream 35 and a liquid stream 51 containing condensed silane.

The system also includes a conveying apparatus for conveying the silane-depleted overhead fraction 11 produced from the light-ends distillation column 5 (FIG. 1) to the condenser 37 (FIG. 2) and a conveying apparatus for conveying the silane-condensed overhead fraction 42 to the gas-liquid separator 38. A heat exchanger 36 may be used to thermally contact the liquid stream 51 with the silane-depleted overhead fraction 11 produced from the light-ends distillation column 5 (FIG. 1) to condense a portion of the silane in the silane-depleted overhead fraction 11 produced from the light-ends distillation column 5. A conveying apparatus conveys the silane-depleted overhead fraction 11 produced from the light-ends distillation column 5 to the heat exchanger 36 (FIG. 2) and a conveying apparatus conveys the partially condensed silane-depleted overhead fraction 41 produced in the heat exchanger 36 to the condenser 37. A conveying apparatus conveys the liquid stream 32 or a vaporized product thereof into the light-ends distillation column 5 (FIG. 1).

In some embodiments, the system (FIG. 3) includes a heavy-ends distillation column 15 to produce a silane-enriched overhead fraction 43 and a silane-depleted bottoms fraction 31 relative to the silane-enriched bottoms fraction 6 produced from the light-ends distillation column 5, the silane-depleted bottoms fraction being enriched in compounds having a boiling point greater than silane. A conveying apparatus conveys the silane-enriched bottoms fraction 6 from the light-ends distillation column 5 to the heavy-ends distillation column 15. Alternatively and as shown in FIG. 4, the heavy-ends distillation column 15' may separate material prior to separation in the light-ends distillation column 5 and a conveying apparatus conveys the silane-enriched overhead fraction 3' produced from the heavy-ends distillation column 15' to the light-ends distillation column 5.

In embodiments wherein the silane-containing stream 3 contains ethylene and as further described below, the system may include an adsorber (e.g., molecular sieve) and an ethylsilane distillation column to produce an ethylsilane-depleted overhead fraction comprising purified silane product and an ethylsilane-enriched bottoms fraction relative to the silane-enriched overhead fraction produced from the heavy-ends distillation column.

In embodiments of the present disclosure in which crude silane contains compounds having a boiling point greater than silane and as shown in FIG. 5, the system includes a heavy-ends distillation column 15 for producing a silane-enriched overhead fraction 43 and a silane-depleted bottoms fraction 31 relative to the silane-containing stream 7, the silane-depleted bottoms fraction 31 comprising silane and being enriched in one or more compounds having a boiling point greater than silane relative to the silane-containing stream 7. The system also includes a silane-recovery separation unit 10 (e.g., distillation column) for producing a silane-enriched overhead fraction 13 and a silane-depleted bottoms fraction 8 relative to the silane-depleted bottoms fraction 31 produced from the heavy-ends distillation column 15. A conveying apparatus conveys the silane-depleted bottoms fraction 31 produced from the heavy-ends distillation column 15 to the silane-recovery separation unit 10.

Referring now to FIG. 6, the system may also include a light-ends distillation column 5 for producing a silane-depleted overhead fraction 11 that is enriched in compounds having a boiling point less than silane and a silane-enriched bottoms fraction 7 that is depleted in compounds having a boiling point less than silane relative to a silane-containing feed stream 3 introduced into the light-ends distillation column 5. A conveying apparatus conveys the silane-enriched bottoms fraction 7 to the heavy-ends distillation column 15. A conveying apparatus conveys the silane-enriched overhead fraction 13 produced from the silane-recovery separation unit 10 to the light-ends distillation column 5. Alternatively and as shown in FIG. 8, the heavy-ends distillation column 15 may separate material prior to separation in the light-ends distillation column 5' and a conveying apparatus conveys the silane-enriched overhead fraction 43 produced from the heavy-ends distillation column 15 to the light-ends distillation column 5'.

Referring now to FIG. 7 and in embodiments wherein the silane-containing stream 3 contains ethylene, the system may include an adsorber 52 (e.g., molecular sieve) for removing a portion of ethylene from the silane-enriched overhead fraction 43 produced from the heavy-ends distillation column 15 and to form an ethylene-depleted effluent stream 54. A conveying apparatus conveys the silane-enriched overhead fraction 43 produced from the heavy-ends distillation column 15 to the adsorber 52. The adsorber 52 may be a molecular sieve which causes a portion of the ethylene to react with silane and form ethylsilane. The system includes an ethylsilane distillation column 60 and a conveying apparatus conveys the ethylene-depleted effluent stream 54 to the ethylsilane distillation column 60. The ethylsilane distillation column 60 produces an ethylsilane-depleted overhead fraction 62 comprising purified silane product and an ethylsilane-enriched bottoms fraction 64 relative to the ethylene-depleted effluent stream 54 produced from the adsorber 52. A conveying apparatus conveys the ethylsilane-enriched bottoms fraction 64 into the light-ends distillation column 5.

In some embodiments and as shown in FIG. 9, the system may recover silane from both the light-ends stream and the heavy-end stream in processes for purifying a silane-containing stream. As shown in FIG. 9, the system includes a light-ends distillation column 5 for producing a silane-depleted overhead fraction 11 and a silane-enriched bottoms fraction 6 relative to the silane-containing stream 3, the silane-depleted overhead fraction 11 comprising silane and compounds having a boiling point less than silane. A condenser 37 condenses a portion of the silane in the silane-depleted overhead fraction 11 produced from the light-ends distillation column 5. The system includes a gas-liquid separator 38 for producing a gaseous stream 35 and a liquid stream 51 containing condensed silane. A conveying apparatus conveys the silane-condensed overhead fraction 42 from the condenser to the gas-liquid separator 38. The system includes a heat exchanger 36 for thermally contacting the liquid stream 51 with the silane-depleted overhead fraction 11 produced from the light-ends distillation column 5 to condense a portion of the silane in the silane-depleted overhead fraction 11 produced from the light-ends distillation column 5.

A conveying apparatus conveys the liquid stream 51 or a vaporized product thereof to the light-ends distillation column 5. A conveying apparatus conveys the silane-depleted overhead fraction 11 produced from the light-ends distillation column 5 to the heat exchanger 36. A conveying apparatus conveys the partially condensed silane-depleted overhead fraction 41 produced in the heat exchanger 36 to the condenser 37.

The system includes a heavy-ends distillation column 15 for producing a silane-enriched overhead fraction 43 and a silane-depleted bottoms fraction 31 relative to the silane-enriched bottoms fraction 6 produced from the light-ends distillation column 5, the silane-depleted bottoms fraction 31 comprising silane and being enriched in one or more compounds having a boiling point greater than silane relative to the silane-enriched bottoms fraction 6. The system includes a silane-recovery separation unit 10 (e.g., distillation column) for producing a silane-enriched overhead fraction 13 and a silane-depleted bottoms fraction 8 relative to the silane-depleted bottoms fraction 31 produced from the heavy-ends distillation column 15.

In accordance with the system shown in FIG. 9, a conveying apparatus conveys the silane-depleted overhead fraction 11 produced from the light-ends distillation column 5 to the condenser 37. A conveying apparatus conveys the silane-enriched bottoms fraction 6 produced from the light-ends distillation column 5 to the heavy-ends distillation column 15. A conveying apparatus conveys the silane-depleted bottoms fraction 31 produced from the heavy-ends distillation column 15 to the silane-recovery separation unit 10. A conveying apparatus conveys the silane-enriched overhead fraction 13 produced from the silane-recovery separation unit 10 to the light-ends distillation column 5.

In embodiments wherein the silane-containing stream 3 contains ethylene and as further described above, the system may include an adsorber (e.g., molecular sieve) and an ethylsilane distillation column (both not shown) to remove ethylene from the overhead fraction 43 produced from the heavy-ends distillation column 15.

In this regard, suitable conveying apparatus for use in the systems of FIGS. 1-9 are conventional and well known in the art. Suitable conveying apparatus for the transfer of gases include, for example, a recirculation fan or blower. Suitable conveying apparatus for conveying liquids include, for example, pumps and compressors. In this regard, it should be understood that, use of the phrase "conveying apparatus" herein is not meant to imply direct transfer from one unit of the system to another but rather only that the material is transferred from one unit to another by any number of indirect transfer parts and/or mechanisms. For example, material from one unit may be conveyed to further processing units (e.g., purification) and then conveyed to the second unit. In this example, each unit of conveyance including the intermediate processing equipment itself may be considered to be the "conveying apparatus" and the phrase "conveying apparatus" should not be considered in a limiting sense.

Preferably, all equipment utilized in the systems for purifying silane is resistant to corrosion in an environment that includes exposure to compounds used and produced within the system. Suitable materials of construction are conventional and well-known in the field of the disclosure and include, for example, carbon steel, stainless steel, MONEL alloys, INCONEL alloys, HASTELLOY alloys, nickel, graphite (e.g., extruded or iso-molded) and silicon carbide (e.g., converted graphite or extruded).

EXAMPLES

Example 1

Modeling the Recovery of Silane from Light-ends Distillation Operations

Silane recovery from the overhead fraction of a light-ends distillation column was modeled using ASPEN modeling software. The overhead fraction from light-ends distillation operations is introduced into an interchanger where it was cooled to −94° C. (−137° F.) at 1825 kPa (250 psig). The partially condensed overhead fraction containing condensed liquid (55 wt % of the feed) and vapor (45 wt % of the feed) is introduced into a condenser that is cooled with liquid nitrogen. The condenser cools the partially condensed overhead fraction to −129° C. (−200° F.) at a pressure slightly less than 1825 kPa (250 psig). The silane-condensed overhead fraction contains liquid silane (77 wt % of the feed) that is 98 wt % pure and vapor (23 wt % of the feed). The liquid silane stream may contain nitrogen (2 wt %), methane (0.5 wt %), hydrogen (0.06 wt %), ethane (0.004 wt %), and ethylene (0.001 wt %).

The condensed stream is introduced into a gas-liquid separator containing a demister and operated at a pressure of slightly less than 1825 kPa (250 psig) to produce a silane-depleted gaseous stream (23 wt % of the overhead fraction produced from the light-ends distillation column) and a silane-enriched liquid stream (77 wt % of the overhead fraction produced from the light-ends distillation column) relative to the silane-depleted overhead fraction produced from the light-ends distillation column. The gaseous stream is warmed by a natural convection finned exchanger before neutralization and disposal. The liquid stream (−129° C. (−200° F.)) is introduced into the interchanger to exchange heat with overhead fraction produced from the light-ends distillation column to reduce energy requirements for the condenser. The liquid stream is fully vaporized in the interchanger and is further warmed in a convection finned exchanger. The vaporized liquid stream is combined with fresh crude silane, compressed to 2170 kPa (300 psig) and introduced into the light-ends distillation operations.

Example 2

Modeling the Recovery of Silane from Heavy-ends Distillation Operations

Silane recovery from the overhead fraction of a heavy-ends distillation column was modeled using ASPEN modeling software. A system containing light-ends distillation and heavy-ends distillation without silane-recovery distillation was first modeled. The system includes two operating trains in which crude silane (97.4 wt % silane with 0.8 wt % of compounds with a boiling point less than silane and 1.8 wt % of compounds with a boiling point greater than silane) is introduced into a light-ends distillation column. The light-ends distillation columns of the first and second trains each produce a silane-enriched bottoms fraction and a silane-depleted overhead fraction relative to crude silane. The overhead fractions contained 3% of the silane in the feed. The bottoms fractions from the light-ends distillation columns were each introduced into a heavy-ends distillation column to produce a silane-enriched overhead fraction and a silane-depleted bottoms fraction relative to the bottoms fraction produced in the light-ends distillation column. The bottoms fractions produced from the heavy-ends distillation column contained 3.4 wt % of the silane from the feed and the overhead fraction contained 96.6 wt % of the silane in the feed. The overhead fraction was at a temperature of −26° C. (−14° F.) and 2032 kPa (280 psig). The silane yield was 93.8 wt % and 3.3 wt % of silane was lost in the bottoms fraction of the heavy-ends distillation column.

The system described above was modeled with the bottoms fraction produced from the heavy-ends distillation column of each train being introduced into a silane-recovery distillation column to produce a silane-enriched overhead fraction and a silane-depleted bottoms fraction relative to the bottoms fraction produced from the heavy-ends distillation column. The bottoms fraction produced from the silane-recovery distillation column may be neutralized and disposed of and the overhead fraction is recycled back to the light-ends distillation columns. The bottoms fractions of the silane-recovery distillation column is at a temperature of 36° C. (97° F.) and 1793 kPa (260 psig). In this system, the bottoms fractions produced from the heavy-ends distillation columns contain 3.7 wt % of the silane in the feed and the overhead fractions produced from the heavy-end distillation columns (which may be used as silane product, optionally after further processing such as removal of ethylene) contain 96.3 wt % of the silane in the feed. The silane yield was 97.1 wt %, a 3 wt % increase from the system that did not include silane-recovery distillation columns.

Example 3

Commercial-Scale Recovery of Silane from Heavy-ends Distillation Operations

The commercial-scale system included two operating trains in which crude silane was introduced into a light-ends distillation column. The light-ends distillation columns of the first and second trains each produced a silane-enriched bottoms fraction and a silane-depleted overhead fraction relative to crude silane. The bottoms fractions from the light-ends distillation columns were each introduced into a heavy-ends distillation column to produce a silane-enriched overhead fraction and a silane-depleted bottoms fraction relative to the bottoms fraction produced in the light-ends distillation column. The bottoms fractions produced from the heavy-ends distillation column of each train contained about 60 wt % silane and was introduced into a silane-recovery distillation column at a temperature of 40° C. (104° F.) and pressure of 2000 kPa (275 psig) to produce a silane-enriched overhead fraction and a silane-depleted bottoms fraction relative to the bottoms fraction produced from the heavy-ends distillation column.

The silane-recovery column operated at an overhead pressure of 1320 kPa (177 psig) with a 2.2 kPa (0.32 psi) differential pressure across the column. The bottoms temperature was 1.7° C. (35° F.). The silane-recovery column produced an overhead fraction with a silane concentration of 98.8 wt % and a bottoms fraction with a silane concentration of 7.7 wt % with the weight ratio of overhead fraction to bottoms fraction being 1.3:1. The overhead fraction was recycled to the light-ends distillation column and the bottoms fraction was neutralized and disposed of About 94% of silane was recovered by the silane-recovery distillation column.

In this regard, it should be understood that the operating conditions described in Example 1-3 are exemplary and other conditions may be used.

When introducing elements of the present disclosure or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above apparatus and methods without departing from the scope of the disclosure, it is intended that all matter contained in the above description and shown in the accompanying figures shall be interpreted as illustrative and not in a limiting sense.

What is claimed is:

1. A process for purifying a silane-containing stream, the stream comprising silane and one or more compounds having a boiling point greater than silane and being substantially free of trichlorosilane, tetrachlorosilane and tetraflourosilane, the process comprising:

introducing the silane-containing stream to a heavy-ends distillation column to produce a silane-enriched overhead fraction and a silane-depleted bottoms fraction relative to the silane-containing stream, the silane-depleted bottoms fraction comprising silane and being enriched in one or more compounds having a boiling point greater than silane relative to the silane-containing stream; and introducing the silane-depleted bottoms fraction to a silane-recovery separation unit to produce a silane-enriched fraction and a silane-depleted fraction relative to the silane-depleted bottoms fraction produced from the heavy-ends distillation column.

2. The process as set forth in claim 1 wherein the silane-recovery separation unit is a distillation column which produces a silane-recovery separation unit silane-enriched overhead fraction and a silane-recovery separation unit silane-depleted bottoms fraction relative to the silane-depleted bottoms fraction produced from the heavy-ends distillation column.

3. The process as set forth in claim 1 comprising introducing a feed stream to a light-ends distillation column to produce an overhead fraction and a bottoms fraction, the feed stream comprising silane, one or more compounds having a boiling point greater than silane and one or compounds having a boiling point less than silane, the overhead fraction being depleted in silane and enriched in compounds having a boiling point less than silane, the bottoms fraction being enriched in silane and depleted in compounds having a boiling point less than silane, wherein a portion of the bottoms fraction forms the silane-containing stream that is fed to the heavy-ends distillation column.

4. The process as set forth in claim 1 wherein the silane-enriched overhead fraction produced from the heavy-ends distillation column comprises compounds having a boiling point less than silane and wherein the silane-enriched overhead fraction is introduced into a light-ends distillation column to form a silane-depleted overhead fraction comprising compounds having a boiling point less than silane and a silane-enriched bottoms fraction relative to the silane-enriched overhead fraction produced from the heavy-ends distillation column.

5. The process as set forth in claim 3 wherein the silane-enriched fraction produced from the silane-recovery separation unit is recycled by introducing it into the light-ends distillation column.

6. The process as set forth in claim 3 wherein the amount of silane in the silane-depleted fraction produced from the silane-recovery separation unit is less than about 10 wt % of the silane in the silane-depleted bottoms fraction produced from the heavy-ends distillation column.

7. The process as set forth in claim 3 wherein the sum of the amount of silane in the overhead fraction produced from the light-ends distillation column and the silane-depleted fraction produced from the silane-recovery separation unit is less than about 15 wt % of the silane in the silane-containing stream.

8. The process as set forth in claim 3 wherein the feed stream and the silane-enriched overhead fraction produced from the heavy-ends distillation column comprise ethylene and wherein the silane-enriched overhead fraction produced from the heavy-ends distillation column is introduced into an adsorber to remove a portion of the ethylene and form an ethylene-depleted effluent stream.

9. The process as set forth in claim 8 wherein the adsorber comprises a molecular sieve which causes a portion of the ethylene to react with silane and form ethylsilane, the process further comprising introducing the ethylene-depleted effluent stream which comprises ethylsilane to a ethylsilane distillation column to produce an ethylsilane-depleted overhead fraction comprising purified silane product and an ethylsilane-enriched bottoms fraction relative to the ethylene-depleted effluent stream produced from the adsorber.

10. The process as set forth in claim 9 wherein the ethylsilane-enriched bottoms fraction is recycled by introducing the ethylsilane-enriched bottoms fraction into the light-ends distillation column.

11. The process as set forth in claim 2 wherein the temperature of the silane-depleted bottoms fraction produced from the silane-recovery distillation column is from about 70° C. to about 130° C. upon discharge from the silane-recovery distillation column.

12. The process as set forth in claim 2 wherein the silane-recovery distillation column operates at an overhead pressure of from about 1500 kPa to about 2600 kPa (about 220 psia to about 380 psia).

13. The process as set forth in claim 3 wherein the components of the feed stream do not substantially undergo any reaction until being discharged as the overhead fraction produced from the light-ends distillation column, as the silane-enriched overhead fraction produced from the heavy-ends distillation column, the silane-enriched overhead fraction produced from the silane-recovery separation unit and the silane-depleted bottoms fraction produced from the silane-recovery separation unit.

14. The process as set forth in claim 1 wherein the silane-containing stream is substantially free of alkali or alkaline earth-metal silanes.

15. A process for purifying a silane-containing stream, the stream comprising silane and one or more compounds having a boiling point greater than silane, the process comprising:
introducing the silane-containing stream to a heavy-ends distillation column to produce a silane-enriched overhead fraction and a silane-depleted bottoms fraction relative to the silane-containing stream, the silane-depleted bottoms fraction comprising silane and being enriched in one or more compounds having a boiling point greater than silane relative to the silane-containing stream; and
introducing the silane-depleted bottoms fraction to a silane-recovery separation unit to produce a silane-enriched fraction and a silane-depleted fraction relative to the silane-depleted bottoms fraction produced from the heavy-ends distillation column;
wherein the one or more compounds having a boiling point greater than silane are selected from the group consisting of ethane, ethylene, ethyl-silane, diethyl silane, toluene, dimethoxyethane and mixtures thereof.

16. A process for purifying a silane-containing stream, the stream comprising silane and one or more compounds having a boiling point greater than silane, the process comprising:
introducing a feed stream to a light-ends distillation column to produce an overhead fraction and a bottoms fraction, the feed stream comprising silane, one or more compounds having a boiling point greater than silane and one or compounds having a boiling point less than silane, the overhead fraction being depleted in silane and enriched in compounds having a boiling point less than silane, the bottoms fraction being enriched in silane and depleted in compounds having a boiling point less than silane, wherein a portion of the bottoms fraction forms the silane-containing stream that is fed to the heavy-ends distillation column;
introducing the silane-containing stream to a heavy-ends distillation column to produce a silane-enriched overhead fraction and a silane-depleted bottoms fraction relative to the silane-containing stream, the silane-depleted bottoms fraction comprising silane and being enriched in one or more compounds having a boiling point greater than silane relative to the silane-containing stream; and
introducing the silane-depleted bottoms fraction to a silane-recovery separation unit to produce a silane-enriched fraction and a silane-depleted fraction relative to the silane-depleted bottoms fraction produced from the heavy-ends distillation column;
wherein the one or more compounds having a boiling point less than silane are selected from the group consisting of hydrogen, nitrogen and methane.

* * * * *